INDUCTIVE VIBRATION PICKUP APPARATUS

Filed Jan. 11, 1968 2 Sheets-Sheet 1

INVENTORS.
ROBERT S. MORROW
KENNETH E. HAYS
BY Murray & Finkhauser
Attorneys

INDUCTIVE VIBRATION PICKUP APPARATUS

Filed Jan. 11, 1968 2 Sheets-Sheet 2

INVENTORS.
ROBERT S. MORROW
KENNETH E. HAYS
By Murray & Jenkhauer
Attorneys

United States Patent Office 3,521,158

Patented July 21, 1970

3,521,158

INDUCTIVE VIBRATION PICKUP APPARATUS

Robert S. Morrow, Columbus, and Kenneth E. Hays, Gahanna, Ohio, assignors to IRD Mechanalysis, Inc., Worthington, Ohio, a corporation of Ohio Filed Jan. 11, 1968, Ser. No. 697,108
Int. Cl. G01r *33/00;* G08c *21/00*
U.S. Cl. 324—34 6 Claims

ABSTRACT OF THE DISCLOSURE

Electrical sensing apparatus such as vibration pickups of the type in which cyclical variations in the distance between a stationary inductor in the tank circuit of an oscillator and a vibrating metallic object in the field of the inductor are reflected as cyclical changes in amplitude at the output of the oscillator. The apparatus incorporates automatic gain control circuitry to compensate the change in sensitivity which results from changes of instantaneous gap between the aforesaid stationary inductor and the vibrating metallic object in its field.

CROSS-REFERENCES TO RELATED APPLICATIONS

Application Ser. Nos. 697,109 and 197,110, filed concurrently herewith and assigned to the assignee of this invention.

BACKGROUND OF THE INVENTION

In the past, electrical vibration pickups have been provided comprising an electrical oscillator having a tank circuit including an inductive element, characterized in that the amplitude of the oscillations produced by the oscillator is a function of the displacement between the tank circuit inductive element and a metallic object in the field of the inductive element. Such devices operate on the eddy current principle, the output of the oscillator being a function of the radiated energy absorbed by the metallic object in the field of the inductive element. As will be understood, this absorbed energy, is in turn, a function of the distance between the inductive element and the metallic object. Consequently, such devices can be used as proximity detectors or as pickups for vibration and analyzing apparatus. When the device is employed as a pickup, the output of the oscillator produces a sinusoidal wave shape signal resulting from the oscillatory vibrational movement of a metallic member relative to the stationary inductive pickup.

Consider, for instance, any rotating shaft housed within a bearing. Due to unbalance, misalignment, wear, eccentricity or other causes, the shaft will oscillate in a plane normal to its axis of rotation. Consequently, by mounting an inductive proximity pickup in a bearing for the shaft such that the periphery of the shaft is in the inductive field of the pickup, the output of the oscillator to which the pickup is connected can be rectified and used to generate a sinusoidal vibrational signal for vibration analyzing purposes. The principal use of such pickup devices is to measure the instantaneous vibration characteristics of rotating bodies such as motor, engine and dynamo components.

SUMMARY OF THE INVENTION

It will be appreciated that in the use of an inductive proximity pickup of the type described above, the measured peak-to-peak displacement of the vibration is a function of the static gap existing between the inductive pickup and the object in its field before the object starts to vibrate. For example, in the case of a proximity pickup mounted in a bearing for a rotating shaft, the static gap comprises the distance between the pickup coil mounted in the bearing and the periphery of the shaft while it is stationary. This gap, however, may change due to various factors. For instance, there is always a clearance between a shaft and its bearing. When the shaft is stationary, it will usually rest on the bottom of the bearing, leaving a relatively wide clearance between the top of the shaft and the inner ring of the bearing. However, when the shaft starts to rotate, it will tend to center itself, thereby changing the distance between the periphery of the shaft and the inductive pickup. Furthermore, changes in temperature of the shaft, its bearing or the housing for the inductive pickup itself will vary the static gap. If these changes in static gap are not compensated, the sensitivity of the vibrational pickup assembly will surely vary. For example, sensitivity variation without static gap correction is plus or minus 14% for a gap ranging between 15 to 25 mils, the nominal gap being on the order of about 20 mils. Furthermore, in order to maintain sensitivity constant, it is necessary to maintain the automatic gain control circuitry in the detector stable over a temperature range from about 32° F. to 150° F., the normal expected variation.

Accordingly, the objects of the invention include:

To provide means, in apparatus of the type in which an inductive vibration pickup coil is included in the tank circuit of an oscillator and the output of the oscillator is rectified to produce a vibrational signal, to compensate for sensitivity variation in the output vibrational signal due to variations in static gap between the pickup coil and a vibrating object in its field.

To provide static gap compensating means of the type described employing an automatic gain control circuit incorporating a field effect transistor, the internal resistance of the field effect transistor being varied as a function of a voltage proportional to the static gap distance at any instant.

To provide an automatic gain control circuit for a vibrational signal produced by an inductive element in the tuned circuit of an oscillator, the gain control circuit incorporating a field effect transistor together with an unbypassed feedback resistor in the source lead of the field effect transistor to achieve temperature stability.

In accordance with the invention, inductive virbrational pickup apparatus is provided in which an inductive pickup coil is included in the tank circuit of an oscillator such that the amplitude of the output oscillations from the oscillator will sinusoidally vary as an object in the field of the coil vibrates. The output of the oscillator is rectified to produce a sinusoidal direct current voltage, the amplitude of which will vary as the instantaneous gap varies. In order to compensate for gap changes, the sinusoidal direct current voltage is AC coupled across the drain and source electrodes of a field effect transistor, while this same sinusoidal direct current voltage is applied across a resistor in shunt with a smoothing capacitor. By applying at least a portion of the voltage across the aforesaid resistor between the gate and source leads of the field effect transistor, its dynamic resistance can be made to vary as a function of the average voltage level of the sinusoidal direct current voltage, which is proportional to instantaneous gap. As a result, any change in static gap will also vary the dynamic resistance of the field effect transistor, thereby maintaining the amplitude of the sinusoidal direct current voltage appearing on the drain electrode of the field effect transistor substantially constant over a wide range of static gap values.

Further, in accordance with the invention, temperature compensation of the field effect transistor over a range of about 32° F. to 150° F. is provided by means of an unbypassed feedback resistor in the source lead of the field effect transistor, thereby providing a degenerative circuit effect.

DESCRIPTION OF THE PREFERRED EMBODIMENT(S)

Figure 1:
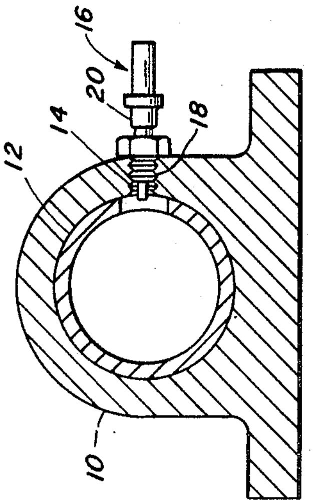
FIG. 1 is a cross-sectional view showing the manner in which the inductive probe or pickup of the invention is mounted in relation to one type of rotating body.

With reference now to the drawings, and particularly to FIG. 1, a bearing housing 10 is shown provided with an interior bushing 12. The side wall of the housing 10 is provided with a threaded opening 14 which receives a proximity pickup 16 having external threads 18.

Figure 2:
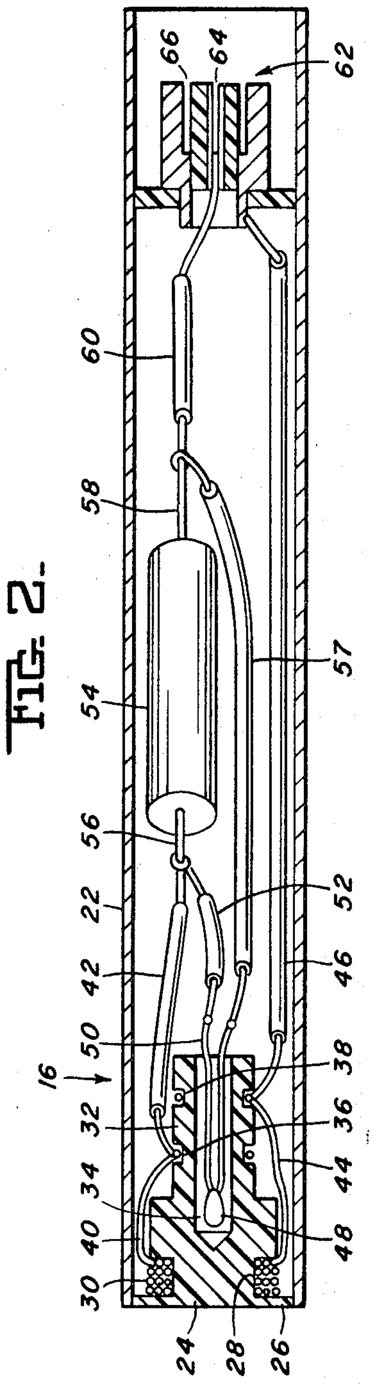
FIG. 2 is a cross-sectional view of the probe shown in FIG. 1.

The details of the proximity pickup 16 are illustrated in FIG. 2. It comprises a hollow tubular member 22. A bobbin 24 is provided at the forward, open end of the tubular member 22. The bobbin 24 is formed from nylon or other similar plastic insulating material. The bobbin 24 has a cylindrical portion 26 which fits snugly within the tubing 22. A groove 28 in the bobbin 24 receives a coil 30 of wire which constitutes the actual inductive pickup which, as will be explained, constitutes the inductive element in the tank circuit of an oscillator.

The bobbin 24 has a rear sleeve portion 32 having a bore 34 and having peripheral grooves 36, 38. A first wire end 40 of the coil 30 is wound in the groove 36 and is soldered to a larger diameter lead 42 which is also wound into the groove 36. In a similar manner, the other end of the coil 30 is wound in the groove 38 and soldered to a larger diameter lead 46 which is also wound into the groove 38.

Inserted into the bore 34 is a negative temperature coefficient thermistor 48 having a first lead 50 connected to lead 52 and a second lead 54 spliced to lead 56. The resistance of the thermistor 48, having a negative temperature coefficient of resistance, will decrease as its temperature increases and will increase as its temperature decreases.

An electrical resistor 54 is provided with leads 56, 58. The lead 56 is soldered to the conductors 42 and 52. The lead 58 is soldered to the conductor 57 and a conductor 60.

As will be explained more in detail hereinafter, the thermistor 48 is connected in parallel with the resistor 54. The parallel combination of thermistor 48 and resistor 54 is in series with the coil 30. A coaxial cable connector 62 is fitted into the rear end of the tube 22. One connector terminal 64 is electrically connected to the conductor 60, while the other connector terminal 66 is electrically connected to the conductor 46. The entire space within the tubular member 22 is filled with a potting material such as an epoxy resin.

Figure 3:
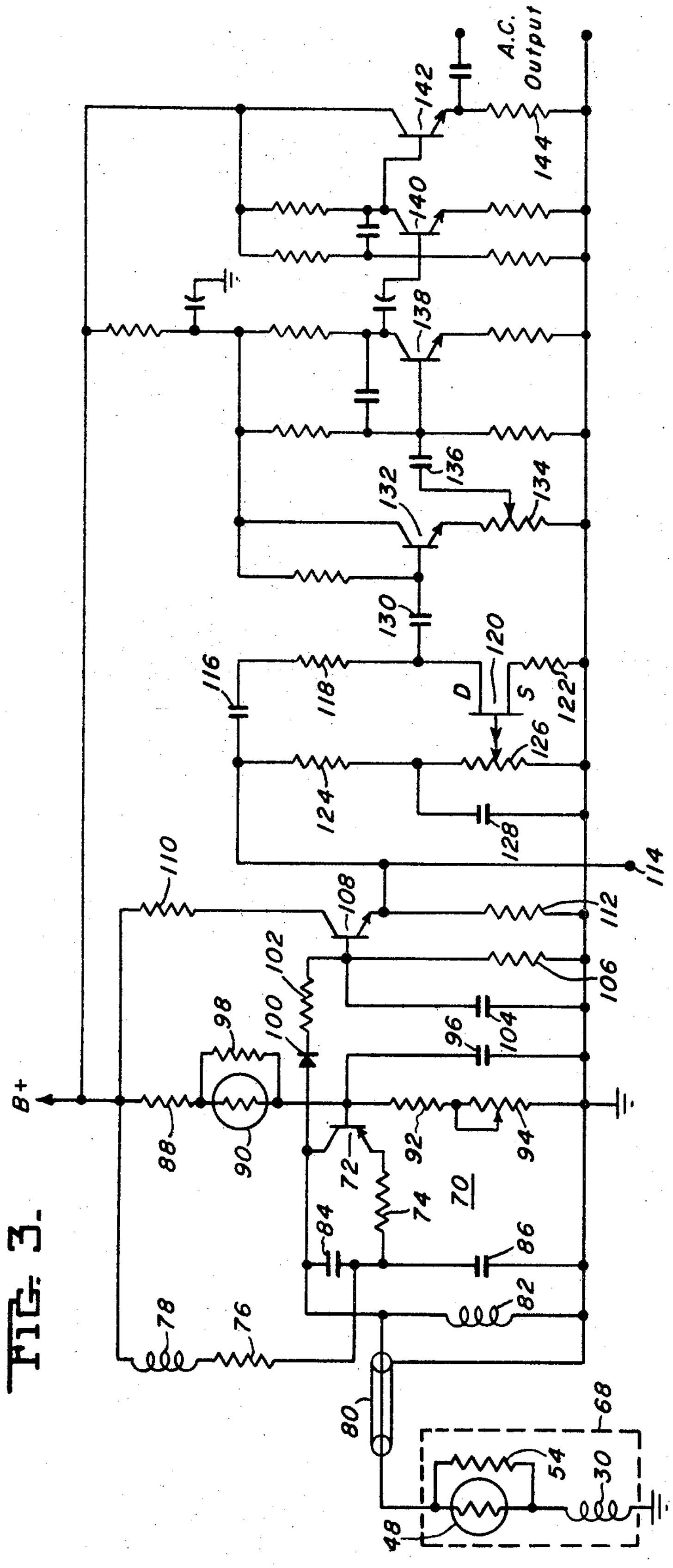
FIG. 3 is a schematic circuit illustration of one embodiment of the invention employing thermistors for temperature compensation.

The pickup unit just described is identified in FIG. 3 by the broken line 68. The illustrated electrical elements are the thermistor 48, the resistor 54 and the coil 30. The oscillator itself is of the Colpitts type and is identified generally by the reference numeral 70. It is provided with a PNP transistor 72 having its emitter connected through resistors 74 and 76 and a radio frequency choke coil 78 to a source of driving potential, identified as B+.

The tank circuit of the oscillator 70 includes the coil 30, the thermistor 48 and resistor 54. One end of coil 30 is connected to ground through the shield of a coaxial cable 80, while the upper end of the parallel combination of thermistor 48 and resistor 54 is connected through the center conductor of the coaxial cable 80 to the collector of transistor 72. With the arrangement shown, the pickup assembly enclosed by broken lines is in parallel with a second inductor coil 82 which is connected between the collector of transistor 72 and ground.

In shunt with the inductor 82 are series-connected capacitors 84 and 86, the junction of these capacitors also forming the junction between resistors 74 and 76. Base drive for the transistor 72 is provided by means of a voltage divider network including resistor 88, a second thermistor 90, a resistor 92 and a rheostat 94. A capacitor 96 is in parallel with resistance elements 92 and 94. A resistor 98 is in shunt with the thermistor 90. The inductor 82 and the pickup coil 30 both form a part of the tank circuit for oscillator 70. The inductance of inductor 82 is much larger than that of coil 30.

With the arrangement shown, the oscillator 70 will produce output oscillations on the collector of transistor 72 at a frequency of about 1 megacycle. These oscillations are rectified by a rectifier 100 and applied through resistor 102 across a smoothing capacitor 104. The resulting rectified signal is, in turn, applied across resistor 106 and, hence, appears at the base of a direct current emitter follower transistor 108. The collector of transistor 108 is connected to the B+ voltage source through resistor 110; while its emitter is connected to ground through resistor 112.

If it is assumed, for example, that a metallic object is located at a fixed distance from the pickup coil 30 and in the field of the coil, the oscillator 70 will produce output oscillations which are rectified by rectifier 100 and applied to the base of transistor 108. Under these circumstances, a direct current voltage, proportional in magnitude to the distance between the pickup coil and the object in its field, will appear at the emitter of transistor 108 and a gap output terminal 114. There are no alternating components in the rectified direct current voltage.

Now, if it is assumed that an object such as a shaft within the bearing 12 of FIG. 1, is vibrating back and forth with respect to the pickup coil 30, oscillations will still be produced at a frequency of about 1 megacycle by the oscillator 70. However, the oscillations will cyclically vary in amplitude as the periphery of the shaft moves toward and away from the pickup coil 30. The frequency of this cyclic variation will correspond to the vibrational frequency of the shaft within bearing 12. Under these circumstances, the output of the oscillator at the collector of transistor 72 will appear as waveform A in FIG. 4 wherein the oscillator output signal periodically varies in amplitude.

Figure 4:
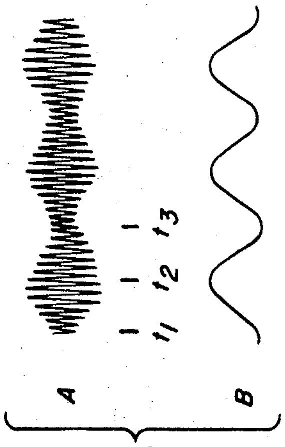
FIG. 4 comprises waveforms illustrating the operation of the circuit of FIG. 3.

Between times $t_1$ and $t_2$ in waveform A of FIG. 4, the periphery of the shaft within bearing 12 is moving away from the pickup 30 such that less radiated energy is absorbed as eddy current and hysteresis losses. As a result, the amplitude of the output oscillations increases. Between times $t_2$ and $t_3$ of FIG. 4, however, the periphery of the shaft within bearing 12 is moving toward the pickup; whereupon the loss of radiated energy increases and the amplitude of the oscillations decreases.

The oscillations, after rectification in rectifier 100 and smoothing by capacitor 104, will appear as a sinusoidal varying direct current voltage illustrated as waveform B in FIG. 4. This voltage, when applied to the base of transistor 108, will still produce a direct current voltage at the output terminal 114. This same alternating current component will be applied through a coupling capacitor 116 and a resistor 118 to the drain lead of a field effect transistor 120. The source lead of the field effect transistor 120, in turn, is connected to ground through a resistor 122.

The alternating component comprising waveform B of FIG. 4 is also applied through resistor 124 across a potentiometer 126 having a capacitor 128 in shunt therewith. The capacitor 128 filters the alternating current signal so that only an average direct current signal is applied to the potentiometer 126. The movable tap on the potentiometer 126, in turn, is connected to the gate of the field effect transistor 120. By virtue of the capacitor 128, the voltage appearing across the potentiometer 126 is a steady-state voltage comprising the average voltage of the alternating component direct current waveform illustrated as waveform B in FIG. 4. This average voltage will vary the dynamic resistance of the field effect transistor 120.

Let us assume, for example, that a voltage of 6 volts is developed at output terminal 114 when the static gap is 20 mils. A voltage proportional to 6 volts will, therefore, appear across potentimeter 126 and be applied to the gate of the field effect transistor 120. Now, let us assume that the static gap between the coil and the metallic object changes and that the gap output voltage at terminal 114 decreases to approximately 5.5 volts. Since the pickup coil 30 is now closer to the metallic object, the sensitivity of the apparatus will increase. However, the decrease in the voltage across potentiometer 126 will decrease the dynamic resistance of the field effect transistor 120 and the output amplitude of the signal appearing on the drain lead of the field effect transistor 120 will also decrease. In a similar manner, an increase in voltage will cause an increase in the dynamic resistance of the field effect transistor 120, thereby increasing the amplitude of the signal on the drain of field effect transistor 120.

The signal on the drain of field effect transistor 120 is applied through a capacitor 130 to the base of an emitter follower transistor stage 132. The transistor 132 has its emitter connected to ground through a potentiometer 134. The movable tap on potentiometer 134 is connected through a capacitor 136 to a pair of transistor amplifier stages 138 and 140. Finally, the output of amplifier stage 140 is applied to emitter follower stage 142 such that an output sinusoidal waveform corresponding to waveform B in FIG. 4 appears across an output impedance 144. The remaining elements of the stages 132, 138, 140 and 142 are conventional and need not be described in detail.

In the calibration of the circuitry of FIG. 3, a metallic object is usually spaced from the end of the pickup 68 by about 20 mils. Thereafter, the rheostat 94 in oscillator 70 is adjusted until the output voltage at terminal 114 assumes 6 volts. Thereafter, the pickup 68 is moved to a distance of 10 mils (average) from a vibrating object of known displacement. For example, the known displacement may be 1 mil. The potentiometer 134 on emitter follower stage 132 is then adjusted such that the output sinusoidal vibration signal has an amplitude of 240 millivolts RMS. Following this procedure, the pickup 68 is moved to a distance of 30 mils from a vibrating object of known displacement, and the object again caused to vibrate with a peak-to-peak displacement of 1 mil. The potentiometer 126 connected to the gate of field effect transistor 120 is now adjusted such that the output sinusodial vibration signal again has an amplitude of 240 millivolts RMS. This procedure is repeated such that the output amplitude between a static gap of 10–30 mils will be 240 millivolts RMS per displacement of 1 mil peak-to-peak.

Without the field effect transistor 120 included in the circuit of FIG. 3, sensitivity variation is plus or minus 14% for a static gap ranging between 15 to 25 mils. However, by including the field effect transistor in the circuitry, variation in pickup sensitivity is reduced from plus or minus 14% to less than plus or minus 2% for a static gap ranging from 6 mils to 34 mils. Temperature stability and apparatus interchangeability are achieved by the addition of the unbypassed feedback resistor 122 in the source lead of the transistor. This maintains the sensitivity substantially constant between 32° F. and 150° F. At 150° F., the sensitivity of the circuit increases 2%; however this can be compensated for in the following amplification stages.

Reverting again to FIG. 2, the pickup coil 30 is a small coil of copper wire. The electrical resistance of this copper wire has a positive temperature coefficient. In this respect, its resistance at 350° F. is about 67% higher than at 75° F. The quality factor, Q, of the coil is inversely proportional to its resistance and, therefore, decreases at elevated temperatures. This, of course, causes a corresponding decrease in the sensitivity of the oscillator 70 and affects the output amplitude of the signal across resistor 144. The thermistor 48 is, therefore, inserted in series with the coil 30; and since the thermistor has a negative temperature coefficient of resistance, it compensates for the change in resistance of the coil 30 resulting from temperature changes. The thermistor, however, has an exponential characteristic. That is, its resistance does not change linearly with temperature. This characteristic, however, can be made linear by placing the resistor 54 in parallel with the thermistor.

The resistance of the thermistor can be expressed as:

$$R = Ae^{B/T}$$

wherein
R=resistance of thermistor,
$e$=base of natural logarithm,
A=constant for thermistor 48,
B=constant for thermistor 48, and
T=absolute temperature.

Therefore, in accordance with Ohm's law, the total resistance, $R_T$, of elements 48, 54 can be expressed as:

$$R_T = \frac{R_{54} \times R_{48}}{R_{54} + R_{48}} = \frac{R_{54} \times Ae^{B/T}}{R_{54} + Ae^{B/T}}$$

wherein $R_{54}$=resistance of resistor 54, and
$R_{48}$=resistance of thermistor 48.

By selecting a thermistor 48 having suitable constants A and B (which are characteristics of the thermistor) and by selecting a suitable resistor 54, the total resistance $R_T$ can be made inversely linear as desired.

The operation of the thermistor 90 is somewhat similar, the resistor 98 in parallel with it causing the total resistance of the two elements to vary linearly rather than exponentially. As the temperature rises and the resistance of thermistor 90 decreases, the negative drive voltage on the base of PNP transistor 72 also decreases. This compensates for a decrease in the internal impedance of the transistor 72 which results from increased temperature.

The present invention thus provides a means for compensating for changes in both the resistance of the pickup coil 30 as well as changes in the sensitivity of the oscillator itself due to temperature changes.

We claim as our invention:

1. Inductive vibration pickup apparatus comprising an oscillator having a tank circuit including an inductive pickup coil such that the amplitude of the output oscillations from the oscillator will sinusoidally vary as an object in the field of the pickup coil vibrates, means for rectifying the output of the oscillator to produce a sinusoidally varying unidirectional current voltage the amplitude of which varies as the instantaneous gap between said object and the pickup coil varies, a field effect transistor having source, drain and gate electrodes, means including a capacitor for applying at least a portion of said sinusoidally varying unidirectional current voltage across the source and drain electrodes of the field effect transistor, and means responsive to the average value of said sinusoidally varying unidirectional current voltage for varying the bias on the gate electrode of said field effect transistor and hence its dynamic resistance whereby the amplitude of the sinusoidally varying unidirectional current voltage on the drain electrode of said field effect transistor will be substantially constant over a range of values of said instantaneous gap.

2. The inductive vibrational pickup apparatus of claim 1 wherein said means for varying the bias on the gate electrode of said field effect transistor comprises a resistor connected across the output of said rectifying means, a smoothing capacitor in shunt with at least a portion of said resistor, and means connecting a point on said resistor to the gate electrode of said field effect transistor.

3. The inductive vibrational pickup apparatus of claim 2 including an emitter follower stage interposed between said rectifying means and said resistor.

4. The inductive vibrational pickup apparatus of claim 1 including an emitter follower transistor connected to the output of said rectifying means, and means including said capacitor and a resistor connecting the emitter of said emitter follower transistor to the drain electrode of said field effect transistor.

5. The inductive vibrational pickup apparatus of claim 4 wherein the emitter of said emitter follower transistor is connected to a point of neutral potential, and a resistor connecting the source electrode of said field effect transistor to said point of neutral potential to thereby maintain said field effect transistor essentially temperature invariant.

6. The inductive vibrational pickup apparatus of claim 1 including amplifying stages connected to said drain electrode of the field effect transistor.

References Cited

UNITED STATES PATENTS

| | | | |
|---|---|---|---|
| 3,170,113 | 2/1965 | Harmon | 324—34 X |
| 3,271,694 | 9/1966 | Brown | 331—109 X |

ALFRED E. SMITH, Primary Examiner

U.S. Cl. X.R.

307—279, 304; 331—65, 109; 340—261